United States Patent [19]
Uy

[11] Patent Number: 5,252,277
[45] Date of Patent: Oct. 12, 1993

[54] PROCESS FOR SPINNING POLYPEPTIDE FIBERS FROM SOLUTIONS OF LITHIUM THIOCYANATE AND LIQUEFIED PHENOL

[75] Inventor: William C. Uy, Newark, Del.

[73] Assignee: E. I. Du Pont de Nemours and Company, Wilmington, Del.

[21] Appl. No.: 965,787

[22] Filed: Oct. 23, 1992

[51] Int. Cl.$^5$ .............................. D01F 4/00; D01F 4/02
[52] U.S. Cl. .................................... 264/129; 264/202; 264/203; 264/204; 264/210.8; 264/233; 427/385.5
[58] Field of Search ................... 264/129, 178 R, 202, 264/203, 204, 210.8, 233; 427/384, 385.5

[56] References Cited

U.S. PATENT DOCUMENTS

| | | | |
|---|---|---|---|
| Re. 22,650 | 6/1945 | Bley | 106/141 |
| 2,697,085 | 12/1954 | Bamford et al. | 264/202 X |
| 3,121,766 | 5/1962 | Ballard et al. | 264/202 |
| 3,387,070 | 6/1968 | Wakasa et al. | 264/202 X |
| 3,696,058 | 10/1972 | Teti | 521/40 |
| 4,500,700 | 2/1985 | Urry | 528/328 |
| 4,594,409 | 6/1986 | Hayashi et al. | 528/328 |
| 4,857,403 | 8/1989 | Lucca et al. | 428/364 |
| 5,171,505 | 12/1992 | Lock | 264/202 |

FOREIGN PATENT DOCUMENTS 675299 7/1952 United Kingdom.

OTHER PUBLICATIONS

U.S. patent application Ser. No. 07/618,505 filed on Nov. 28, 1990 (now U.S. Pat. No. 5,171,505).
English Translation of Japanese Reference 57-4,723 Published on Jan. 27, 1982.
English Translation of Japanese Reference 2-240,165 Published on Sep. 25, 1990.
Bhat & Ahirrao, "Investigation of the Structure of Silk Film Regenerated with Lithium Thiocyanate Solution", Journal of Polymer Science, vol. 21, pp. 1273-1280 (1983).
Jun Magoshi & Shigeo Nakamura, "Studies on Physical Properties & Structure of Silk, Glass Transition & Crystallization of Silk Fibroin," Journal of Applied Polymer Science, vol. 19, pp. 1013-1015 (1975).
Chimura et al., "X-Ray Diffraction of Stretched Silk Fibroin Films of the Silk 1 Crystal Type", Sen. i Gakkaish 45, No. 8: 345-9 (1989).
J. Magoshi, "Physical properties & structure of silk: 4.Spherulites grown from aqueous solution of Silk Fibroin," *Polymer,* vol. 18, 643-646 (Jul. 1977).

*Primary Examiner*—Leo B. Tentoni

[57] ABSTRACT

This invention relates to novel processes for preparing polypeptide solutions and spinning them into fibers. The process involves dissolving a polypeptide in a solvent system comprising lithium thiocyanate (LiSCN) and a liquefied phenol selected from the group consisting of phenol, m-chlorophenol, m-fluorophenol, and m-bromophenol or mixtures thereof. The solutions may be spun using certain wet spinning and dry-jet wet spinning methods. The process is especially useful for making silk fibroin fibers.

11 Claims, 1 Drawing Sheet

PROCESS FOR SPINNING POLYPEPTIDE FIBERS FROM SOLUTIONS OF LITHIUM THIOCYANATE AND LIQUEFIED PHENOL

BACKGROUND OF THE INVENTION

1. Field of the Invention

The present invention relates to processes for spinning polypeptide fibers. More particularly, the invention involves forming polypeptide fibers by dissolving a polypeptide in a solvent system comprising lithium thiocyanate (LiSCN), and a liquefied phenol selected from the group consisting of phenol, m-chlorophenol, m-fluorophenol, and m-bromophenol or mixtures thereof and extruding the solution to form fibers. The process of the current invention is especially useful for spinning fibers from silk fibroin solutions.

2. Description of the Related Art

Proteins are complex, high molecular weight polymers containing carbon, hydrogen, nitrogen, oxygen, and usually sulfur. These protein macromolecules, or polypeptides, are comprised of amino acid residues which are linked together by peptide bonds, (—CO—NH—). Proteins which are found in nature have a wide range of properties depending on their particular amino acid sequence and generally fall into three categories: structural, regulatory, and catalytic. Certain naturally occurring structural polypeptides have fibrous structures including keratin, silk, elastin, and collagen. Structural polypeptides may also be synthesized by either recombinant DNA or, in some cases, by classical organic synthetic methods. Potential applications for structural polypeptide fibers include synthetic or simulated food, textiles, hard and soft tissue prostheses, artificial ligaments, and tough composite materials.

Polypeptides do not melt because of a high degree of hydrogen bonding, thus they require solubilization in a solvent for processing into useful articles.

It is known in the art that fiber spinnable polypeptide solutions may be prepared by dissolving a polypeptide in strongly acidic solvents, such as trichloroacetic acid or trifluoroacetic acid. Organic solvents may also be used as described in Ballard et al., U.S. Pat. No., 3,121,766. This reference discloses wet spinning polypeptide fibers from a birefringent solution of poly-gamma-methyl glutamate in mixed organic solvents such as methylene chloride/ethyl acetate. Acetone, ethyl acetate, and a mixture of these compounds are described as suitable coagulating fluids.

Bamford and Hanby, U.S. Pat. No., 2,697,085 and British published Specification 675,299 disclose wet and dry spinning fibers from a solution containing anhydrocarboxy-amino-acids in a solvent comprising a major proportion of a monohydric phenol, a lower aliphatic carboxylic acid, a halogen-substituted lower aliphatic acid, or a mixture of these compounds. Hydroxyl-containing compounds such as water, methyl alcohol, and ethyl alcohol are described as suitable coagulating fluids.

Ryoichi, U.S. Pat. No., 3,387,070, discloses a process for producing shaped articles of water-insoluble poly-DL-alanine. This method involves dissolving poly-DL-alanine in a mixture consisting of more than 40% by volume of at least one phenol, 0.5-60% by volume of acids having a pKa below 5.0 to produce a polymer solution, and extruding the solution into a coagulating bath.

A particularly important naturally occurring polypeptide is silk fibroin (silkworm silk) which occurs in fibrous form having high strength and a soft hand. The nature of silk fibroin makes it suitable for a wide range of uses including textile applications and in suture materials. However, one problem with obtaining silk from silkworms is that they produce filaments in only one size (ca. 1 denier). Thus, twisted or braided yarns must be used when loads exceed a few grams. Unfortunately, the interstices of such a multifilament yarn can be a route for infection. Accordingly, it would be desirable to be able to produce silk fibers in deniers other than those found in nature. These fibers would be suitable for such applications as monofilament sutures. An object of this invention is to produce such fibers.

Fibroin is known to be soluble in certain high ionic strength aqueous salt solutions, for example, aqueous lithium thiocyanate (LiSCN), sodium thiocyanate (NaSCN), calcium thiocyanate (Ca(SCN)$_2$), magnesium thiocyanate (Mg(SCN)$_2$), calcium chloride (CaCl$_2$), lithium bromide (LiBr), zinc chloride (ZnCl$_2$), magnesium chloride (MgCl$_2$), and copper salts, such as copper nitrate (Cu(NO$_3$)$_2$), copper ethylene diamine (Cu(NH$_2$CH$_2$CH$_2$NH$_2$)$_2$(OH)$_2$), and Cu(NH$_3$)$_4$(OH)$_2$. It has long been known that the salts can be dialyzed out of such aqueous salt/fibroin solutions to produce aqueous solutions of fibroin which are similar in some ways to the liquid contents of a silkworm's silk gland. Fibers have been spun from aqueous fibroin solutions of this type, but more commonly, the solutions have been used to cast films for structure studies. Those skilled in the art have attempted to find suitable solvents for preparing silk fibroin solutions which may be subsequently spun into fibers.

For example, Otoi et al., Japanese Kokoku Patent No. SHO 57[1982]-4723 describe a method for preparing a silk spinning solution involving dissolution of fibroin in an aqueous solution of copper-ethylenediamine, copper hydroxide-ammonia, copper hydroxide-alkali-glycerin, lithium bromide, sodium thiocyanate, or nitrates or thiocyanates of zinc, calcium, or magnesium. The solution is then dialyzed using a multilayered structure and used to fabricate fibers or films.

Although polypeptide fibers have been spun from the spinning solutions described above, one problem is that many of the solvents tend to be harsh and partially degrade the polypeptide. Dichloroacetic acid, trifluoroacetic acid, and a mixture of formic acid/lithium chloride, are especially harsh and subject the polymer to some degree of degradation. Fibers prepared from such solutions tend to be deficient in certain physical properties, such as mechanical strength. Therefore, there is a need to prepare a fiber spinnable polypeptide solution containing a solvent which does not measurably degrade the polypeptide. An object of the present invention is to prepare such a solution and to produce fibers therefrom.

SUMMARY OF THE INVENTION

The present invention relates to methods for spinning polypeptide fibers, particularly silk fibroin fibers. The process generally involves the steps of: (1) forming a spinnable solution comprising about 5 to about 40% by weight of a polypeptide in a solvent comprising lithium thiocyanate (LiSCN) dissolved in a liquefied phenol selected from the group consisting of phenol, m-chlorophenol, m-fluorophenol, and m-bromophenol, and (2) spinning the solution into fibers by extruding the solution through a spinneret. After coagulation, the fibers may be washed with water and then drawn to produce fibers having good physical properties.

Preferably, the solvent is lithium thiocyanate dissolved in liquefied phenol or m-chlorophenol, and the amount of lithium thiocyanate is less than 20% by weight based on the solvent.

Different spinning techniques may be used including wet spinning and dry-jet wet spinning methods. In a wet spinning process, the solution is extruded into a liquid coagulating medium, such as a mixture of diethylene glycol and methanol, to remove the solvent. In a dry-jet wet spinning process, the solution is extruded into an inert, non-coagulating liquid, e.g., air, and then into a liquid coagulating medium, e.g., a mixture of diethylene glycol and methanol.

This invention also encompasses a process for coating shaped articles with the polypeptide solution.

DETAILED DESCRIPTION OF THE INVENTION

Figure 1:
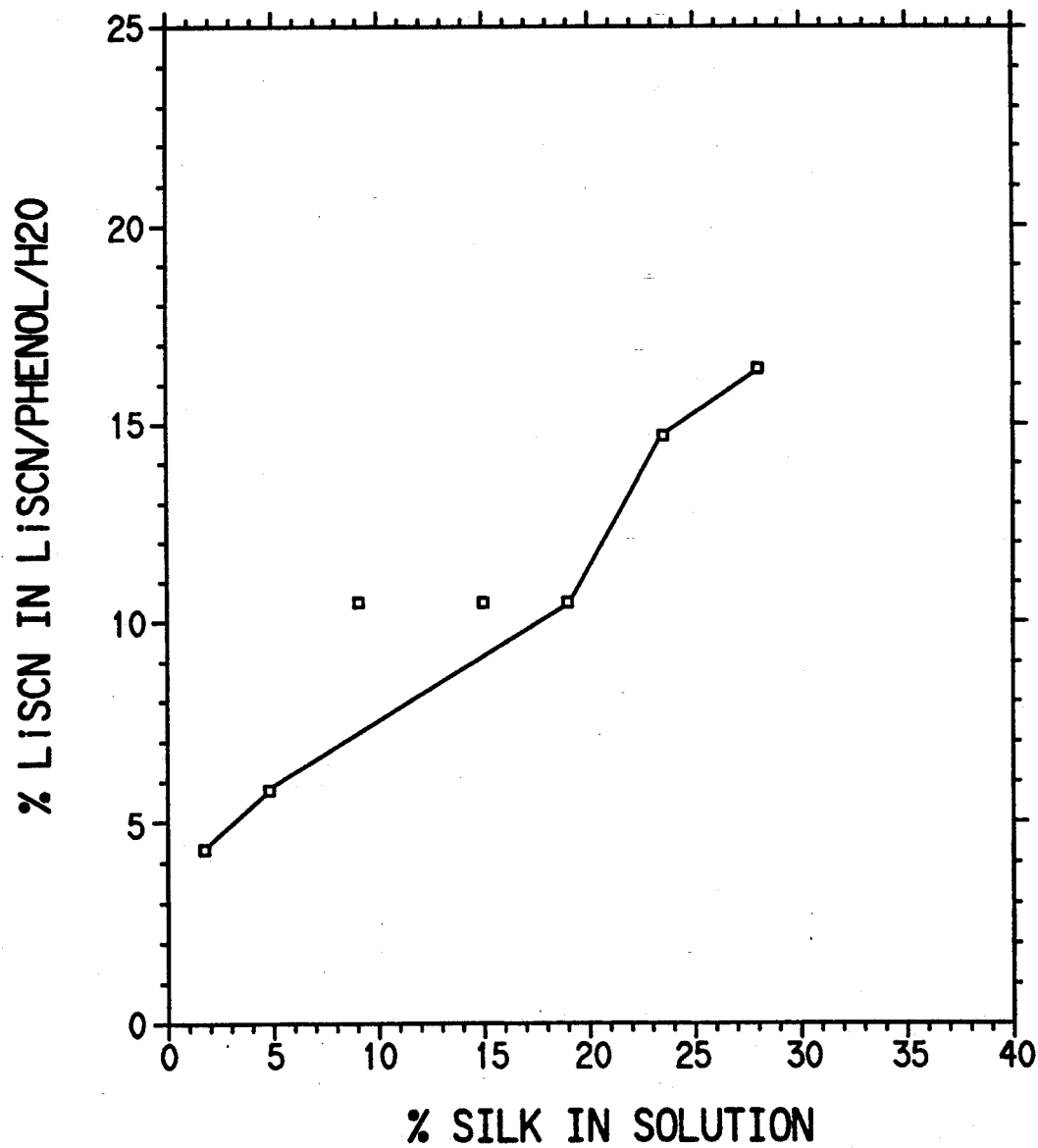
FIG. 1 is a graph showing the approximate amount of LiSCN (weight percentage) needed in the LiSCN/phenol/$H_2O$ solvent to prepare a fiber spinnable solution containing a specified amount of silk fibroin.

The process of the current invention generally involves the steps of: (1) forming a spinnable solution of a polypeptide in a solvent system comprising lithium thiocyanate (LiSCN) and a liquefied phenol selected from the group consisting of phenol, m-chlorophenol, m-fluorophenol, and m-bromophenol, and (2) spinning the solution into fibers by extruding the solution through a spinneret.

The phrase "liquefied phenol" is used herein to refer to the phenol in a liquid state. Where the phenol is not a liquid at temperatures near room temperature, the phenol may be hydrated with a small quantity of water, preferably the minimum amount required to liquefy the phenol, at a temperature near room temperature. For example, it is known that phenol, itself, may be liquefied by mixing with approximately 8% water. In the present invention, preferably less than 15 weight percent (wt.%) water based on total solvent (phenol/LiSCN/water) is used to liquefy the phenol. M-chlorophenol, m-fluorophenol, and m-bromophenol are liquids at temperatures slightly above room temperature (approx. 33 degrees C.) and therefore do not generally require addition of water in order to liquefy them.

Alternatively, the phenol may be melted at temperatures less than the temperature which causes degradation of the polypeptide in the presence of LiSCN. The degradation of the polypeptides may be detected by a decrease in the inherent viscosity of the polypeptide solution or in the molecular weight of the polypeptide.

As described above, aqueous LiSCN solutions (LiSCN/water) have been used for the spinning of silk fibroin fibers. However, this solvent system has the disadvantage of requiring large amounts of LiSCN in order to dissolve the fibroin. The LiSCN material is relatively expensive and is often not readily available from chemical suppliers. In addition, with LiSCN, excess foaming occurs during dissolution which results in trapped air bubbles that are difficult to remove and detrimental to fiber spinning processes. It is known that dialysis may be used to remove ionic components and to concentrate a dilute solution in order to prepare a higher quality spin solution. However, such dialysis methods are slow and add an extra step to the operation.

The present invention provides significant advantages over aqueous LiSCN solvent systems. For instance, it has been found that the amount of LiSCN which must be added to certain liquefied phenols in order to dissolve a predetermined quantity of polypeptide is significantly less than the amount of LiSCN required to dissolve the same quantity of that polypeptide in aqueous LiSCN solvent. In addition, when silk fibroin is dissolved in the phenol/LiSCN solvents, there is no foaming. Thirdly, in general, the drawing of fibers spun from solvents containing LiSCN decreases as the concentration of LiSCN increases, thereby limiting the final fiber properties that can be achieved. Thus, the drawing of silk fibers produced from phenol/LiSCN solvent systems is typically improved over fibers produced from aqueous LiSCN solvents.

Suitable phenols for use in the current invention include monohydric phenols which are capable of being liquefied at room temperature in the presence of small quantities of water. Suitable phenols also include monohydric phenols which may be melted at temperatures less than the temperature which causes degradation of the polypeptide in the presence of LiSCN. Phenols having more than one hydroxyl group are good solvents for polypeptides, however they are unacceptable for use in the current invention because of the conditions required to liquefy them.

For instance, di- or tri-hydroxyl phenols must be heated to a temperature greater than approximately 45 degrees C. in order to liquefy them (with or without the presence of small quantities of water). When the silk fibroin and LiSCN materials are added to such a liquid, there is degradation of the silk fibroin due to reaction with LiSCN. In the alternative, if water is used to liquefy the di- or tri-hydroxyl phenols, then large quantities of such water are necessary. This results in solutions which are poor solvents for polypeptides.

The phenols preferred for use in the current invention are phenol, m-chlorophenol, m-fluorophenol, and m-bromophenol, or mixtures thereof. The corresponding ortho compounds are too hydrophobic to dissolve LiSCN. The corresponding para compounds require heating to temperatures which degrade the polypeptides. However, small quantities of the ortho and para compounds may be added to the solvent system of the current invention, provided that they are not present at levels which require heating to harmful temperatures, or the addition of excessive water.

The polypeptides useful in the current invention are capable of being spun into fibers and may be naturally occurring or synthesized by techniques known in the art. Suitable natural polypeptides include, for example, silk fibroin, casein, gelatin, and collagen. Preferably, the synthetic or natural polypeptide has a calculated molecular weight from 20,000 to 350,000 and more preferably from 80,000 to 350,000. By the term, calculated molecular weight, it is meant the molecular weight based on the true molecular formula of the subject polypeptide. By the term, apparent molecular weight, it is meant the molecular weight of the subject polypeptide based on standard analytical techniques such as gel electrophoresis, or gel permeation chromatography.

Different techniques for deriving or synthesizing polypeptides are known in the art. For example, selected polypeptides may be derived from natural sources such as silk cocoons. To a more limited extent, polypeptides may also be synthesized using classical organic synthesis methods described in Kirk-Othmer Encyclopedia of Chemical Technology, Vol. 18, 3rd edition, pp. 888-911. Recombinant DNA methods, as described in Watson & Tooze, Recombinant DNA—A Short Course, 1983, are also useful in preparing structural proteins. The solvent system of the current invention is especially useful for spinning fibers of silk fibroin, as silk fibroin is one of the most difficult polypeptides to dissolve.

The composition of the spin solvent is determined by the amount of polypeptide which is to be dissolved. Polypeptide concentrations of 5–40%, depending on the polypeptide, are generally useful for preparing spinnable solutions. FIG. 1 shows the minimum % of LiSCN required to prepare solutions of silk fibroin of various fibroin concentrations. The minimum concentration of silk fibroin required for a readily spinnable solution is approximately 15 wt.% based on the total weight of the solution. Higher levels of LiSCN are required as the percentage of silk fibroin is increased, as demonstrated in the examples below. In general, the minimum amount of LiSCN required to dissolve the polypeptide is used. This amount may be readily determined experimentally, in accordance with this invention. Preferably, the LiSCN is added in amounts of less than about 20 wt.% based on the total weight of the solvent (phenol/LiSCN/water).

The spinnable solutions are preferably prepared as follows. The amount of LiSCN required to dissolve a predetermined amount of polypeptide is first dissolved in the liquefied phenol. The solution may be heated to increase the speed of dissolution of the LiSCN. The polypeptide is then added with mixing. If heating was used to dissolve the LiSCN in the liquefied phenol, care must be taken to ensure that the solvent is cooled prior to addition of the polypeptide. The temperature must be below the temperature at which the polypeptide degrades in the presence of LiSCN. Once the polypeptide has been added, a vacuum may be applied to remove entrapped air caused by mixing. Alternatively, the vacuum may be applied after dissolution of the polypeptide. The solution should be mixed for a sufficient time to obtain a uniform solution.

If the amount of LiSCN required to dissolve the predetermined amount of polypeptide has not been previously determined, the spinnable solution may be prepared by mixing the polypeptide with the liquefied phenol and adding increments of LiSCN to the solution, until the polypeptide has dissolved. Care must be taken if heating is used to increase the rate of dissolution. It is important that the temperature not be raised so high as to cause degradation of the polypeptide. It should be noted that LiSCN is generally available in the hydrated form. Therefore, the spinnable solutions and the solvents of the current invention typically contain low levels of water originating from the water of hydration of the LiSCN. The presence of this water is in addition to the water, if any, required to liquefy the phenol.

The spinnable solution may then be spun into fibers using elements of processes known in the art. These processes include, for example, wet spinning and dry-jet wet spinning.

In a wet spinning process, the spinning solution is extruded directly into a coagulating bath. The coagulant may be any fluid wherein the spin solvent (phenol/LiSCN/H₂O) is soluble, but wherein the polypeptide is insoluble. The drawability of the fibers obtained is dependent on the nature of the coagulant. Examples of suitable coagulating fluids include glycols (such as diethylene glycol), methanol, N-methyl pyrollidone, dimethyl formamide, ethanol, 1-propanol, isopropyl alcohol, acetone, water and mixtures thereof. Diethylene glycol, methanol, N-methyl pyrollidone, and dimethyl formamide are preferred coagulants, especially when the polypeptide being spun is silk fibroin. In the spinning of silk fibroin, mixtures of diethylene glycol and methanol are preferred as the coagulant.

Preferably, the fibers are drawn while still wet with coagulating fluid. The fibers are then dried under tension in order to prevent shrinkage and to obtain improved tensile properties. In a preferred process, the fibers are washed with water subsequent to coagulation. This appears to improve the drawability of the fibers, as well as causing the extraction of high viscosity coagulants such as diethylene glycol. It is preferred that the fibers be drawn soon after spinning and while still wet. Dry as-spun undrawn fibers are generally brittle and cannot be drawn. In addition, most polypeptides will crystallize with time, making them difficult to draw.

In a dry-jet wet spinning process, the spinning solution is attenuated and stretched in an inert, non-coagulating fluid, e.g., air, in an air-gap spinning process, before entering the coagulating bath. For liquid crystalline spinning solutions, this stretching causes an alignment of the molecules which are then frozen in an oriented arrangement in the coagulation bath. As a result, the fibers often have improved tensile properties over wet-spun fibers. Suitable coagulating fluids are the same as those used in a wet spinning process.

If fine denier filaments are desired, dry-jet wet spinning will usually be the preferred process since the fibers are attenuated in the gap. This enables one to use larger diameter spinneret capillaries than would be possible in a wet spinning process yielding fibers of the same denier. Dry-jet wet spinning is also preferred over wet-spinning processes for high viscosity solutions, because there are no problems with plugging of the spinneret. Occasionally, in wet-spinning processes of high viscosity solutions, there are plugging problems due to interaction of the spin solution with the coagulant.

However, for low viscosity solutions, the fibers may lose their integrity while being attenuated. In such a case, wet spinning is preferred. Plugging of the spinneret during wet spinning of low viscosity solutions is generally not a problem.

It is recognized that the solutions of this invention may have other applications. For instance, the solutions may be used to cast films or be extruded to form other shaped articles. The solutions may also be coated onto various shaped articles, including fibers.

The following examples further illustrate the invention but should not be construed as limiting the scope of the invention.

Test Methods

Fiber Physical Properties

Physical properties such as tenacity, elongation, and initial modulus were measured on one inch fiber samples using methods and instruments which conformed to ASTM Standard D 3822-82. Properties reported are averages of five fiber breaks.

Fiber X-Ray Orientation Angle

A bundle of filaments about 0.5 mm in diameter is wrapped on a sample holder with care to keep the filaments essentially parallel. The filaments in the filled sample holder are exposed to an X-ray beam produced by an X-ray generator (e.g., Philips Electronics Instruments, Model 12045B) operated at 40 kv and 40 ma using a copper long fine-focus diffraction tube and a nickel beta-filter.

The diffraction pattern from the sample filaments is recorded on X-ray film (e.g., Kodak DEF Diagnostic Direct Exposure film) in a Warhus pinhole camera. Collimators in the camera are 0.64 mm in diameter. The exposure is continued for about fifteen to thirty minutes (or generally long enough so that the diffraction feature to be measured is recorded at an Optical Density of ~1.0).

A digitized image of the diffraction pattern is recorded with a video camera. Transmitted intensities are calibrated using black and white references, and gray level (0–255) is converted into optical density. An appropriate pair of reflections (i.e., symmetrically related peaks on the opposite sides of the diffraction pattern's center point) are used for the measurement of Orientation Angle. A data array equivalent to an azimuthal trace through the two selected peaks is created by interpolation from the digital image data file; the array is constructed so that one data point equals one-third of one degree in arc.

The Orientation Angle is taken to be the arc length in degrees at the half-maximum optical density (angle subtending points of 50 percent of maximum density) of the selected peaks, corrected for background. This is computed from the number of data points between the half-height points on each side of the peak (with interpolation being used, this is not an integral number). Both peaks are measured and the Orientation Angle is taken as the average of the two measurements.

In the following examples, parts and percentages are by weights, unless otherwise indicated.

EXAMPLES

Degumming of Raw Silk

Soap powder (35 grams, IVORY SNOW, manufactured by Procter and Gamble) was dispersed in 5000 ml distilled water and heated at about 60 degrees C. until the soap was dissolved. The pH of the solution was 10.4. 120–130 grams of raw silk fibroin (cut into 7.6 cm lengths) were added and dispersed in the solution. The solution was heated to boiling and maintained at the boiling point with continuous stirring for one hour. The degummed silk was then pressed to remove excess solution, boiled in fresh distilled water for an hour, and rinsed in distilled water until the fiber was free of soap. The rinsing procedure was carried out over several days. The degummed silk was then pressed dry, pulled to loosen the tight bundles, and dried overnight in air, followed by drying under vacuum at 60 degrees C. The weight of the recovered degummed silk is generally 72–75% of the original weight of the raw silk.

EXAMPLE 1

This example illustrates the substantial reduction in the amount of lithium thiocyanate required to dissolve silk fibroin when phenol is present in the solution.

Five grams of liquefied phenol (90% phenol, 10% $H_2O$, available from J. T. Baker, Inc.) were weighed into a glass vial and 0.10 gram of degummed silk fibroin was added. Lithium thiocyanate hydrate (LiSCN.x-$H_2O$; 62.2% LiSCN, available from Aldrich Chemical Co., Inc.) was added in small increments of 0.05 to 0.10 gram each with mixing until the fibroin dissolved. The final LiSCN concentration, based on pure LiSCN (calculated based on the weight of the hydrate) in the solvent (phenol/LiSCN/$H_2O$) was calculated to be only 4.28% based on the weight of the phenol/LiSCN/$H_2O$ solvent.

In comparison, 37.0% of pure LiSCN (based on LiSCN/$H_2O$ solvent) was required to dissolve 0.10 gram of the degummed silk fibroin in 5 grams of water with no added phenol.

EXAMPLE 2

This example illustrates dissolution of silk fibroin in a solvent containing LiSCN and m-chlorophenol. Five grams of m-chlorophenol (99% m-chlorophenol, available from Aldrich Chemical Co., Inc.) were weighed into a glass vial and 0.20 g LiSCN hydrate (62.2% LiSCN) was added. After the LiSCN had dissolved, 0.10 g silk fibroin was added. The fibroin was completely dissolved. The LiSCN concentration was calculated to be 2.39% based on solvent (phenol/LiSCN/-$H_2O$).

EXAMPLE 3

This example illustrates the improvement in the degree of drawability of fibers which are hand-pulled from solutions using the phenol/LiSCN solvents of the current invention.

Additional silk fibroin was added in a stepwise fashion to the solution of Example 1 to increase the overall fibroin concentration to 28%. After each fibroin addition, LiSCN hydrate was added in an amount just sufficient to effect dissolution of the silk fibroin. For example, at 19.1% fibroin concentration, a total of 1.42 grams of silk fibroin and 1.02 grams of LiSCN hydrate had been added; at 23.5% fibroin, a total of 2.01 grams silk fibroin and 1.54 grams of LiSCN hydrate had been added; and at 28% fibroin, a total of 2.64 grams of silk fibroin and 1.78 grams of LiSCN hydrate had been added. Monofilaments were drawn from the solution at each stage of addition using a glass rod and the monofilaments were coagulated and extracted in methanol. The wet filaments were hand drawn and allowed to air dry in the drawn state. The degree of draw was 5.5x and 5.0x for 23.5% and 28% silk fibroin, respectively.

In comparison, the draw was only 2.5x for fibers prepared from a 28.6% fibroin solution made in a similar manner from concentrated aqueous LiSCN/$H_2O$ solvent (37% LiSCN) without addition of phenol.

EXAMPLE 4

This example illustrates air-gap spinning of fibroin in phenol/LiSCN/$H_2O$ solvent using a methanol coagulating bath. A spinning solution was prepared as follows: 28.0 grams of LiSCN hydrate (60.0% LiSCN) were dissolved in 84.5 grams of liquefied phenol (90% phenol/10% water). The solution was poured into an Atlantic Mixer (Model No. 2CV, capacity: 150 ml). Degummed silk fibroin was added in incremental portions totaling 37.5 grams and mixed under an argon atmosphere. The mixture was mixed without added external heat for 4 days. Mixing was then stopped, and a full vacuum applied for 1.5 hours to remove entrapped air. The transparent solution was then transferred by gravity flow through the bottom of the mixer to a spin cell. Vacuum was applied to the top and bottom of the spin cell for a few minutes to remove any remaining entrapped air.

Fibers were air-gap spun into a methanol bath using an air gap of 0.64 cm at 30–50 degrees C., at throughputs ranging from 0.401 to 1.602 ml/min using a 10-hole spinneret (0.025 cm holes) at 0.8 to 3.2 m/min. The fibers were collected on bobbins which were kept immersed in methanol to insure complete extraction of the spin solvent components. The yarns were drawn by placing each bobbin of yarn on a chuck for a rolling take-off while immersed with methanol to keep the yarns from drying out. The yarns were passed through a friction tension gate onto a feed roll and were drawn between this feed roll and a draw roll. A pan under the feed roll contained either methanol or water to maintain the fibers in a wet state. Fibers spun using water gave slightly better properties. The as-spun, air-dried yarns had a filament denier ranging from 70 to 205, a tenacity of from 0.36–0.62 g/denier, a break elongation of from 1.1–2%, and a modulus of 33–42 g/denier. The yarns shrank during air drying by an amount of between 26.1–31.6%.

Fibers spun under the following conditions demonstrated the strongest mechanical properties. These conditions included a throughput of 0.8 ml/min at a hole jet velocity of 1.6 m/min, a shear rate of 833/sec., and a wind-up of 3.2 m/min. The yarn was drawn at 3.6x with water in the pan under the feed roll. Such fibers had the following average properties: 20 denier, 2.20 g/denier tenacity, 20.0% break elongation, and 94 g/denier modulus. The single highest tenacity obtained for the fibers under these processing conditions was 2.4 g/denier.

COMPARATIVE EXAMPLE A

This comparative example illustrates the mechanical properties for fiber obtained from a silk fibroin solution using concentrated aqueous LiSCN as the solvent.

74.8 grams of LiSCN hydrate (66.8%) were added to 30.2 grams of distilled water to make a 47.6% LiSCN aqueous solution. This was poured into the Atlantic Mixer (described in Example 4). Degummed silk fibroin was added in small incremental portions totaling 37.5 grams and mixed under an argon atmosphere. The solution was then transferred by gravity flow through the bottom of the mixer to a spin cell. The highly foamy solution was deaerated by extruding the solution from the first cell as a thin film through a slit into the second cell, which was under vacuum. The solution after this deaeration step still appeared whitish due to microscopic air bubbles. A further step in deaeration was done by applying vacuum to the top and bottom ports of the spin cell and pinching off the vacuum line when the solution had expanded and rose to near the top of the cell. The cell was left to deaerate that way overnight.

The fibroin solution was then filtered through a 10-micron filter (x5 "Dynalloy") and spun through the same ten-hole spinneret (0.025 cm holes) as in Example 4. The fibers were spun at a throughput of 0.79 ml/min, with a jet velocity of 1.58 m/min into a 0.75 inch (1.9 cm) air gap and then into a methanol bath. The coagulated 10-filament yarn was wound up at 1.5 m/min for 30 minutes on a bobbin, the bottom of which was immersed in methanol to prevent fiber from drying out. The recorded spin pack pressure was 220 psia (1.5 MPa). The as-spun yarn bobbin was kept immersed in methanol to effect extraction of the LiSCN solvent for 6 days and then immersed in water bath. Lengths of the yarn were hand drawn to near their breaking point (estimated highest draw was 3x) and taped on a cardboard and allowed to dry under tension. Undrawn yarns were also taped down on both ends and allowed to dry.

The undrawn fiber had a filament denier of 333, tenacity of 0.39 g/denier, break elongation of 1.5%, and modulus of 31 g/denier. The best drawn fiber had a filament denier of 202 (calculated out to 1.65x draw), tenacity of 0.69 g/denier, break elongation of 7.3%, and modulus of 48 g/denier.

EXAMPLE 5

This example illustrates air-gap spinning of fibroin in phenol/LiSCN/$H_2O$ solvent using a diethylene glycol coagulating bath.

In a glass jar, 27.89 grams of lithium thiocyanate hydrate (60.5% LiSCN) were added with 84.61 grams liquefied phenol (91% phenol; 9% $H_2O$) and the jar was placed in a beaker of hot water to dissolve the LiSCN hydrate. The resulting solution was poured into the Atlantic mixer and a total of 37.5 grams of degummed silk fibroin were added in small portions with mixing. The solution was then mixed without external heat for 41 hours under an argon atmosphere. A vacuum was then applied to deaerate the 25% fibroin solution for an hour. To avoid continuous loss of water, the vacuum line valve was closed once a vacuum of about 27 in Hg (68.6 cm Hg) was reached. The solution was then transferred to a spin cell by gravity flow through the bottom of the mixer. A 80-micron filter (x13 "Dynalloy") was used.

The fibroin solution was spun through a ten-hole spinneret (.025 cm holes) topped with a 100 mesh screen at 0.400 ml/min throughput rate, giving a jet velocity through each hole of 0.79 m/min, into a 0.64 cm air gap and then into a diethylene glycol bath. The coagulated ten filament yarn was collected at 0.8 m/min on a first roll, and drawn 3x by a second roll rotating at 2.4 m/min, followed by additional drawing (1.3 x) on a third roll rotating at 3.1 m/min. The yarn was then wound on a bobbin on a fourth roll at 3.0 m/min. The yarn was washed free of the solution solvents and the coagulant using a water spray at each roll.

Average filament properties were 43 denier, 1.73 g/denier tenacity, 31% break elongation, 60 g/denier modulus, and an X-ray orientation angle of 24.1 degrees.

EXAMPLE 6

This example illustrates air-gap spinning of silk fibroin in phenol/LiSCN/$H_2O$ using a mixture of diethylene glycol and methanol as the coagulant.

A 25% fibroin spinning solution was prepared as described in Example 5, except the mixing time was 14 days. The solution was spun as in Example 5, except that the coagulating bath used was a 50/50 volumetric mixture of diethylene glycol and methanol, and spinning speeds used were 3–6 times faster. Total in-line draw ratios ranged from 3 to 4. Sample packages were also collected directly on a winder after the fourth roll.

Fibers spun under the following conditions demonstrated the strongest mechanical properties. These conditions included a throughput rate of 0.8 ml/min. at a hole jet velocity of 1.6 m/min., a feed roll speed of 4.0 m/min., a 2nd roll speed of 12.0 m/min., a 3rd roll speed of 16.0 m/min., and a 4th roll speed of 15.8 m/min. for a total draw of 4x, followed by winding-up. Water was sprayed on the 2nd, 3rd and 4th rolls. Under these conditions, the average filament denier/tenacity/elongation/modulus properties were: 7.8 denier/2.2 g/denier/13%/82 g/denier. The X-ray orientation angle ranged from 24.1–31.5 degrees. Residual solvent analysis, performed by ICP-AES (inductively coupled plasma-atomic emission) was less than 0.08% LiSCN.

EXAMPLE 7

This example illustrates the wet-spinning of a polypeptide having the amino acid sequence, [(GVGVP)$_8$(GAGAGS)$_8$]$_{12}$ (calculated molecular weight: 84,000, where G=glycine, V=valine, P=proline, S=serine, and A=alanine) in phenol/LiSCN/H$_2$O solvent using a mixture of diethylene glycol and methanol as a coagulant.

In a glass jar, 17.0 grams of lithium thiocyanate hydrate (60.5% LiSCN) were added with 85.0 grams of liquefied phenol (91% phenol) and the jar was placed in a beaker of hot water to dissolve the LiSCN hydrate. The resulting solution was poured into the Atlantic mixer and a total of 48.0 grams of the polypeptide material were added in small portions with the mixer blades turning at about 40 rpm. The polypeptide material was added in the following manner.

After the first half of the polypeptide material was added, about 20 in. Hg (51 cm Hg) vacuum was applied to deaerate and to bring down the volume. Then half of the remaining polypeptide was added and followed again by vacuum. The last portion of the polypeptide was then added. Once a vacuum of 25 in. Hg (63.5 cm Hg) was reached, the vacuum line valve was closed. The solution was mixed at 20 rpm under vacuum overnight and charged into a spin cell by gravity flow through the bottom of the mixer. A 10-micron filter (x5 "Dynalloy") was used.

The polypeptide solution was spun through a 7-hole and a 15-hole spinneret topped with a 200-mesh screen at a throughput rate of 0.40 ml/min and 0.801 ml/min, respectively. The coagulating bath was a 15/85 volumetric mixture of diethylene glycol and methanol. The coagulated yarn was wound up at 3.5 m/min for the 7-hole spinneret and at 4.9 m/min for the 15-hole spinneret for a total of 2.9x draw. The yarn was washed free of the solution solvents and the coagulant using a water spray at the 2nd, 3rd and 4th draw rolls. Best average filament properties were 35 denier, 1.20 g/denier tenacity, 20% break elongation, 41 g/denier modulus.

What is claimed is:

1. A process for forming polypeptide fibers, comprising the steps of:
   a) forming a spinnable solution comprising 5 to 40% by weight of polypeptide in a solvent comprising lithium thiocyanate dissolved in a liquified phenol selected from the group consisting of phenol, m-chlorophenol, m-fluorophenol, and m-bromophenol and mixtures thereof, and
   b) extruding the solution through a spinneret to form polypeptide fibers.

2. A process for forming silk fibroin fibers; comprising the steps of:
   a) forming a spinnable solution comprising 15 to 35% by weight of silk fibroin in a solvent comprising lithium thiocyanate dissolved in a liquified phenol selected from the group consisting of phenol, m-chlorophenol, m-fluorophenol, and m-bromophenol and mixtures thereof, and
   b) extruding the solution through a spinneret to form silk fibroin fibers.

3. The process of claim 2, wherein the solvent comprises lithium thiocyanate dissolved in liquefied phenol.

4. The process of claim 2, wherein the solvent comprises lithium thiocyanate dissolved in m-chlorophenol.

5. The process of claim 2, wherein the solvent comprises less than 20% by weight of lithium thiocyanate.

6. The process of claim 2, wherein the solution is extruded into a liquid coagulating medium to remove the solvent.

7. The process of claim 6, wherein the liquid coagulating medium comprises a mixture of diethylene glycol and methanol.

8. The process of claim 2, wherein the solution is extruded into an inert, non-coagulating fluid, and then into a liquid coagulating medium to remove the solvent.

9. The process of claim 8, wherein the non-coagulating fluid is air, and the liquid coagulating medium comprises a mixture of diethylene glycol and methanol.

10. The process of claim 9, further comprising the step of:
    c) washing the fibers with water after coagulation, and then drawing the fibers.

11. A process for coating a shaped article with a polypeptide solution, comprising the steps of:
    a) forming a polypeptide solution comprising 5 to 40% by weight of polypeptide in a solvent comprising lithium thiocyanate dissolved in a liquefied phenol selected from the group consisting of phenol, m-chlorophenol, m-fluorophenol, m-bromophenol, and mixtures thereof, and
    b) coating the article with the polypeptide solution and then drying the article to form a coated, shaped article.

* * * * *